Feb. 21, 1933. L. H. WENTE 1,898,753
SPEED CHANGING GEARING
Filed Oct. 12, 1931 3 Sheets-Sheet 1

Inventor
Leslie H. Wente
By Maréchal & Noe
Attorney

Feb. 21, 1933. L. H. WENTE 1,898,753
SPEED CHANGING GEARING
Filed Oct. 12, 1931 3 Sheets-Sheet 2
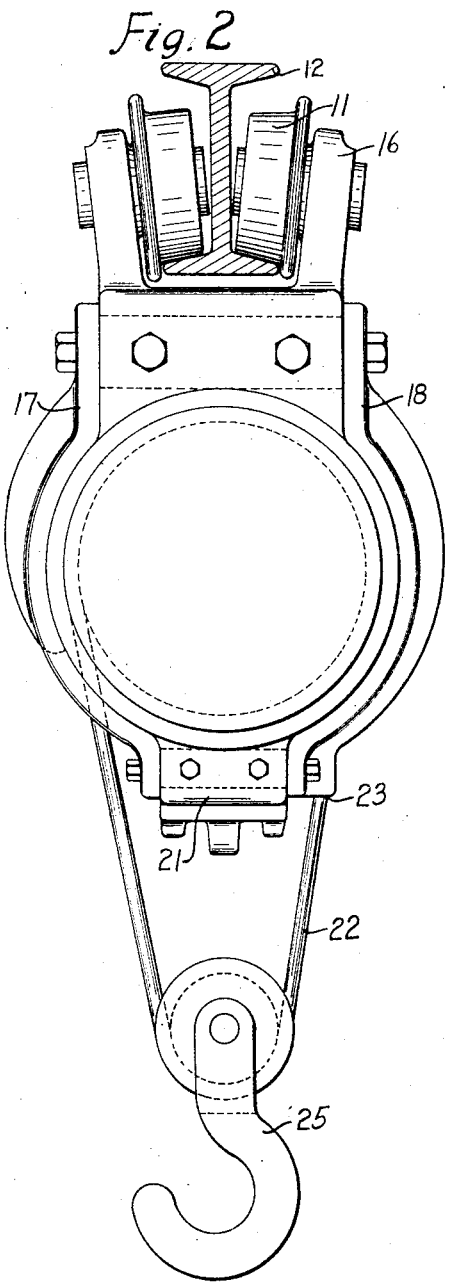
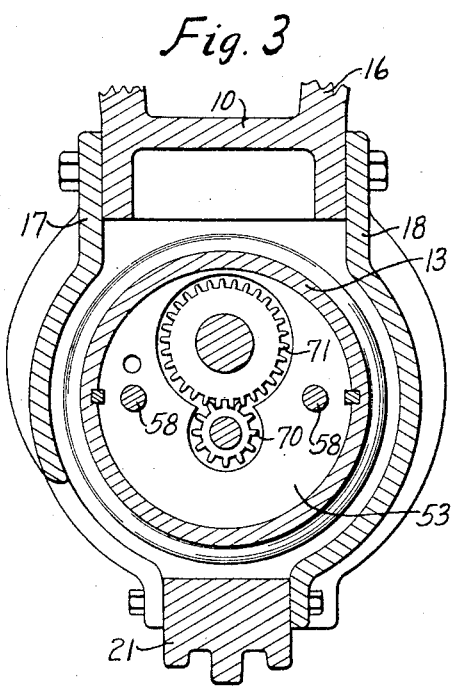
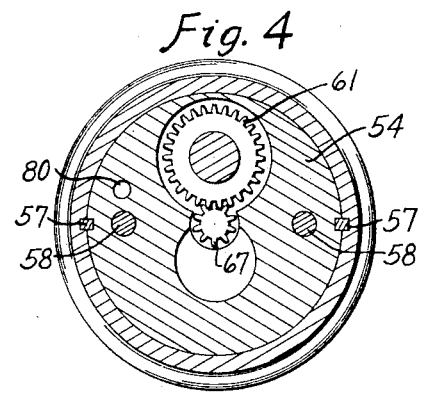
Inventor
Leslie H. Wente
By Maréchal & Noi
Attorney Feb. 21, 1933.    L. H. WENTE    1,898,753
SPEED CHANGING GEARING
Filed Oct. 12, 1931    3 Sheets-Sheet 3

Inventor
Leslie H. Wente
By Maréchal & Noé
Attorney

Patented Feb. 21, 1933

1,898,753

UNITED STATES PATENT OFFICE

LESLIE H. WENTE, OF HAMILTON, OHIO

SPEED CHANGING GEARING

Application filed October 12, 1931. Serial No. 568,381.

This invention relates to speed changing gearing.

The principal object of the invention is the provision of a speed changing unit of compact construction adapted for the transmission of power from a driving to a driven member, the various parts of the unit being of simple construction and adapted to be readily assembled into an enclosing housing.

Another object of the invention is the provision of a speed changing unit having a housing provided with a cylindrical bore in which are bearing plates that rotatably receive gear units, the bearing plates being arranged in contact with one another and secured to the housing to provide a very strong and sturdy gear drive.

Another object of the invention is the provision of a gear reducing unit of the character mentioned in which the housing encloses an electric motor having relatively rotatable elements one of which is secured to the housing while the other is connected to speed reducing gearing supported by the bearing plates.

Still another object of the invention is the provision of a speed changing unit having an enclosing housing enclosing a series of plates which rotatably support gear units each of which embodies a pair of axially aligned relatively fixed gears, antifriction bearings being provided in sockets in the plates and rotatably supporting the gear units, the entire structure being adapted to be readily assembled by axial movements of the various parts into one another.

Other objects and advantages of the invention will be apparent from the following description, the appended claims, and the accompanying drawings, in which—

Fig. 2 is an end view of the speed reducing gear unit;

Fig. 3 is a section on the line 3—3 of Fig. 1;

Fig. 4 is a section on the line 4—4 of Fig. 1;

Figure 1:
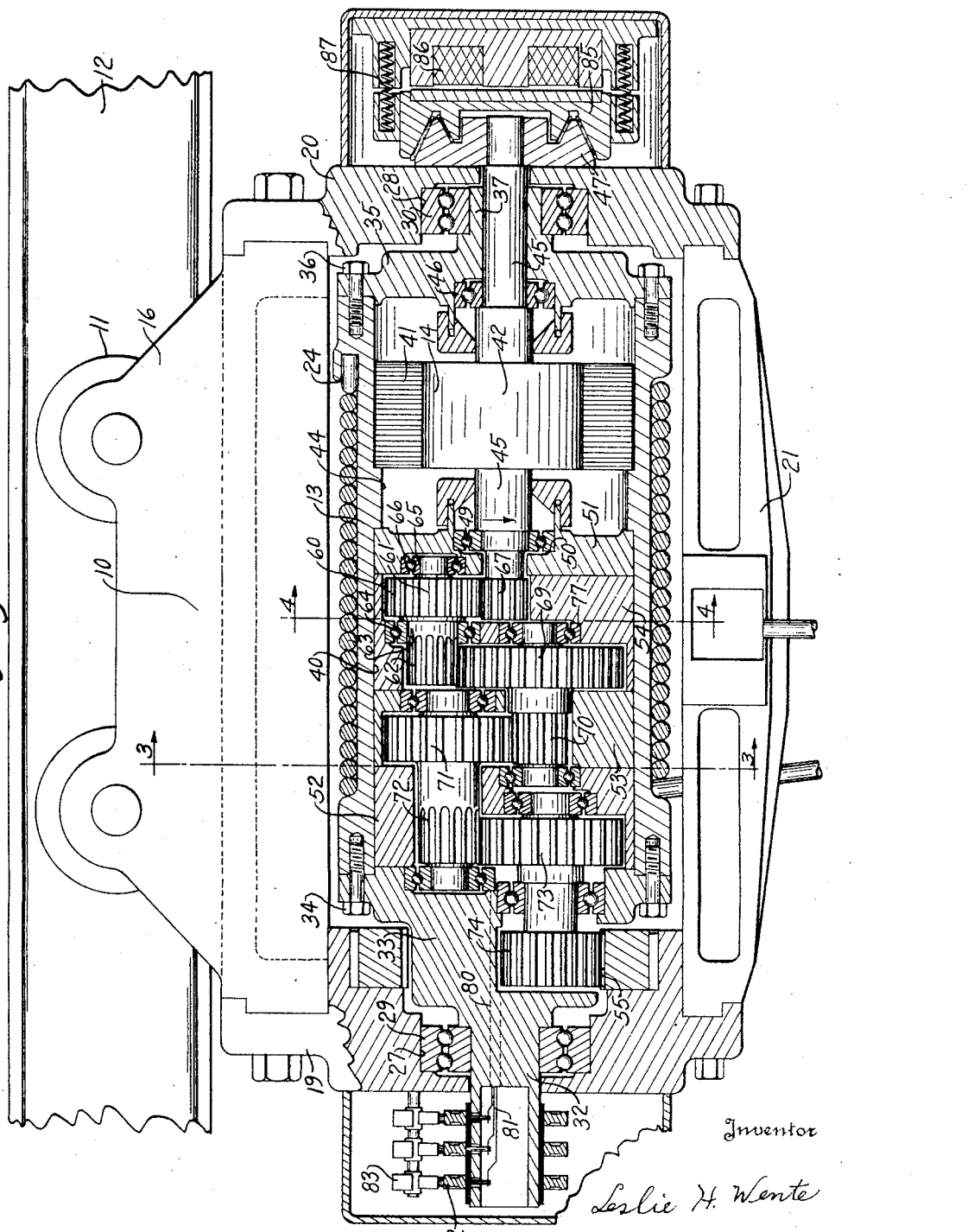
Fig. 1 is a side elevation, partly in longitudinal section, of a speed reducing gear unit embodying the present invention.

Referring more particularly to the drawings by reference numerals, the speed changing gearing of the present invention is adapted for many adaptations and uses. As an example of one use to which it may be applied, Figs. 1 to 4 inclusive show a speed reducing gear unit driven by an electric motor for the operation of a hoisting drum. The hoist embodies a supporting frame structure designated generally 10 which, as shown, is mounted on rollers 11 which operate upon the track 12. 13 designates the cable winding drum which is rotated at slow speeds by an electric motor designated generally 14.

The supporting frame structure 10 embodies the carriage portion 16, side plates 17 and 18, end members 19, 20 and a bottom member 21, these several parts being secured together by bolts or other suitable fastening means, so as to provide an interior space for the reception of the cable winding drum 13. The cable 22 is preferably secured at 23 in the side plate 18 and is wound upon the drum 13, the other end of the cable being secured at 24 to the cable winding drum. The cable extends down from the drum so as to form a loop which suspends the hoisting hook 25, which of course is raised or lowered when the cable is wound up on the drum or unwound therefrom.

In the end members 19 and 20 of the supporting frame structure are antifriction bearing receiving sockets 27 and 28 in which are suitable ball or roller bearings 29 and 30. The bearing 29 rotatably supports the extended end 32 of an end wall 33 provided at one end of the winding drum 13 and preferably secured to the winding drum by means of bolts 34. At the other end of the cable winding drum 13 is an end wall 35 secured by bolts 36 and having an extended stub shaft portion 37 rotatably supported by the bearing 30. It will thus be apparent that the cable winding drum with its end walls 33 and 35 are rotatably supported in the supporting frame 10 in a substantially frictionless manner.

The winding drum 13 is provided with a cylindrical bore 40 and forms a hollow housing for the speed reducing gearing. In the embodiment of the invention shown in Figs. 1 to 4 the cable winding drum 13 also encloses the driving motor 14. The motor 14 comprises the field element 41 and the armature 42. The field element may be inserted into the cylindrical bore of the cable winding drum from the righthand side of the drum as viewed in Fig. 1. Preferably the element 41 abuts against the flange 44 and is held against rotation in the winding drum or housing 13 by means of keys. The motor shaft 45 extends through the stub shaft extension 37 of the end wall 35 and is rotatably supported by means of an antifriction bearing 46 in this end wall 35. Shaft 45 projects beyond the end member 20 of the supporting frame where it is provided with a brake member 47, rotational movements of which may be controlled by a suitable brake device for stopping the rotational movements of the motor element 42 when the current supply to the motor is interrupted.

The armature shaft 45 projects to the left of the armature element 42 and is rotatably supported by an antifriction bearing 49 mounted in the bearing socket 50 provided in the bearing plate 51 which abuts against the left side of the flange 44. Between the plate 51 and the end wall 33 there are plates or disks 52, 53 and 54 which are provided with sockets for receiving antifriction bearings that in turn rotatably support a series of gear units. These gear units provide a speed reducing drive from the shaft 45 of the armature to a stationary internal gear 55 fixed on the end member 19 of the supporting structure.

The plates 52, 53 and 54 and likewise the plate 51 are all secured against rotational movements to the winding drum or housing 13. For this purpose keys 57 are provided preferably at opposite parts of the winding drum and bearing plates, and in addition, through-bolts 58 may extend through the several plates and connect the end wall 33 to the wall 51. The several plates, as will be observed from the drawing, have flat or plane sides which are arranged in contact with one another so that the plates fill the space between the end wall 33 and the wall 51. Their cylindrical peripheral portions fit slidingly within the bore 40 of the winding drum so that the several plates can be applied by moving them one after the other from the left side of the winding drum or housing 13, the sides and peripheral portions of the several parts being accurately machined so that the bearing plates fit between the wall 33 and the plate 51 with their sides held firmly in contact with one another. These plates support the gear units. One of these gear units, designated generally 60 comprises the spur gear 61 and the smaller gear 62, these two gears being relatively fixed and in axial alignment with one another. The gear unit also comprises an antifriction bearing engaging surface 63 on which the inner race of the antifriction bearing 64 fits. A second surface 65 is provided on the gear unit for cooperation with the antifriction bearing 66.

The gear 61 meshes with the driving pinion 67 secured on the end of the armature shaft 45. Gear 62 meshes with a large gear 69 rigid with which is a small gear 70. Gear 70 meshes with a large gear 71 which is rigid with the small gear 72. Gear 72 meshes with a large gear 73 which is fixed to gear 74 that meshes in turn with the internal gear 55 previously referred to. Gear 55 is stationarily mounted in position on the end member 19 so when the armature rotates, say at a speed of 1800 R. P. M., the gear 74 will be rotated very slowly and cause slow rotational movements of the end wall 33, which has the effect of driving the winding drum and also moving the stator element 41 of the motor at a speed of about 20 R. P. M. depending, of course, upon the particular speed reducing ratio chosen. If the armature rotates in the direction of the arrow indicated thereon, the end wall 33 will rotate in the opposite direction, and the stator and rotor element will be moved in relatively opposite directions with respect to the stationary supporting structure. The bearing 66 is received in a bearing socket in the bearing plate 51 to support one end of the gear unit 60. The other end of the gear unit is supported in the bearing 64 and is keyed in a bearing socket provided in the bearing plate 54. The bearing plate 54 is also provided with an enlarged opening for receiving the gear 61, and with a smaller opening for receiving the gear 62. Obviously the bearing 64 can be slipped into the socket provided in the bearing plate 54 and the gear unit 60 then slipped into place by moving it to the left. With the bearing 66 in place in the bearing plate 51 it will be apparent that the assembly of the parts can then readily be effected by moving the entire end plate with its supported gearing axially along the winding drum until gear 61 is in mesh with the gear 67. The bearing 77 can then be inserted in the left side of the bearing plate 54 and the gear unit embodying the gears 69 and 70 moved into place. Each bearing plate acts as a spacer between a pair of adjacent bearing plates in the form of construction illustrated. Each plate also supports bearings and is provided with recesses or openings in which the gear units are rotatably received. The entire structure is such that the several parts can be readily assembled by moving them one after the other into position by movements in an axial direction of the winding drum, and all of the parts are then held in position by securing the end wall 33 to the cable winding drum or housing without requiring individual attaching means for the bearings or gear units. The bearing plates provide a rigid and strong structure so that great forces can be transmitted through the speed reducing gearing from the motor to the housing or other driven part.

The longitudinal through-bolts 58 may extend through the several bearing plates and the end wall 33 through the solid parts of the plates laterally at opposite sides of the centers of the plates as shown in Figs. 3 and 4. If desired, these parts of the plates may be lightened or cut away to reduce the total weight without materially reducing the strength of the plates. It is also through these lateral parts of the plates that the wires can be led to the motor. For this purpose a passage 80 extends through the end wall 33 and through the several plates to lead the wires or cables 81 to the motor. The motor is preferably a three-phase electric motor, current being supplied through the slip rings 82 and the contactor brushes 83, the motor being reversed in direction as desired by a reversing interlocking contactor of any suitable description. When the motor is energized, the brake member 47 is freed from the stationary brake member 85, which, as shown, is adapted to be moved axially and energized by solenoid or electromagnetic coils 86. When the coils 86 are energized the endwise movable brake member 85 is pulled to the right against the action of the springs 87 and the armature is permitted to rotate. When the motor is deenergized, the solenoid coil is also deenergized at the same time, as it is connected in parallel with the motor circuit, and the springs 87 then force the plates 85 and 86 into contact and hold the armature stationary, thus holding the winding drum 13 in fixed position. However, other suitable electrical controls may be provided if desired.

Figure 5:
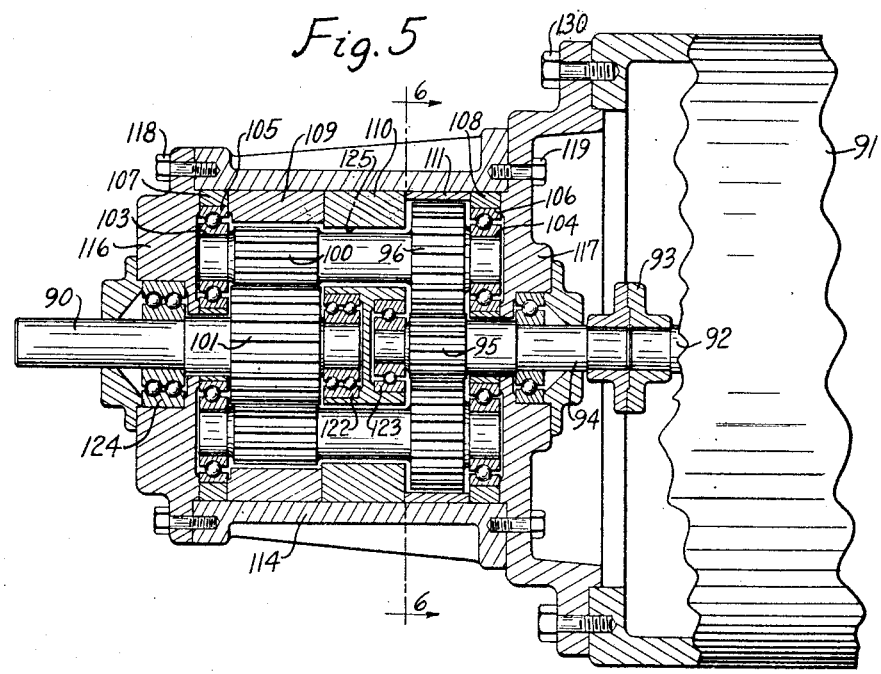
Fig. 5 is a longitudinal sectional view of a modified form of speed changing unit.
Figure 6:
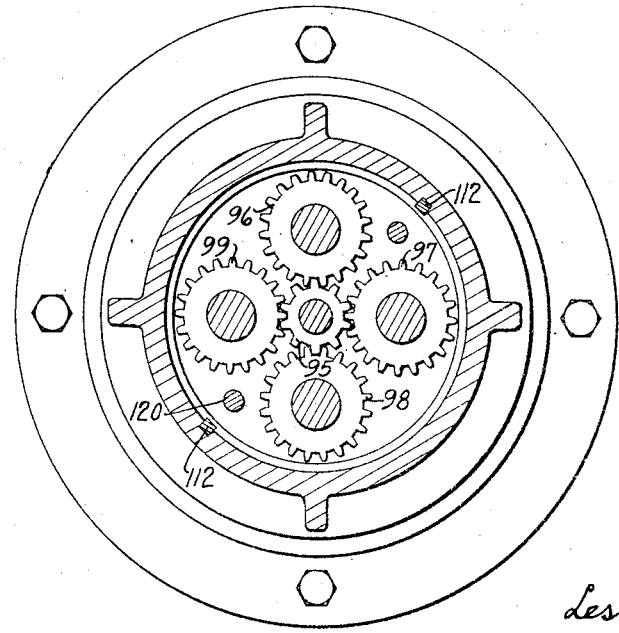
Fig. 6 is a section on the line 6—6 of Fig. 5.

In the modified form of construction shown in Figs. 5 and 6 the speed changing gear unit is provided as an attachment for an electric motor for the operation of a gear or pulley on the driven shaft 90 at a speed different from the armature speed. As shown the unit is designed for speed reduction although obviously the invention is not limited thereto. 91 designates a motor housing which is adapted to be secured in fixed position. The armature shaft 92 is connected by a suitable coupling 93 to a driving shaft 94 on which is a driving pinion 95. This pinion meshes with four spur gears 96, 97, 98 and 99 which are spaced annularly around the axis of gear 95. Gear 96 has fixed to it a smaller gear 100 which meshes with a driven gear 101. Gears 97, 98 and 99 are also fixed respectively to smaller gears meshing with gear 101 so that the drive from the gear 95 to the gear 101 is such as to balance all forces and provide a symmetrical arrangement in which the stresses on the various parts are minimized. Each gear unit such as the unit comprising the gears 96 and 100 is provided with a pair of antifriction bearing receiving surfaces 103 and 104 cooperating with antifriction bearings 105 and 106 which are mounted in bearing plates 107 and 108 respectively. Between the bearing plates 107 and 108 are additional disks or plates 109, 110 and 111 serving as spacers, these various bearing and spacing plates being secured by keys 112 to the gearing housing 114. The bearing and spacing plates are similar to the bearing plates shown in Fig. 1 in that they have cylindrical peripheral surfaces fitting within the internal bore of the housing and have their sides in contact with one another so as to form a rigid, strong structure for the support of the antifriction bearings and the gear units of the reducing drive. At the end of the housing 114 are the end plates 116 and 117 secured to the housing by bolts 118 and 119. Additional through-bolts 120 can be passed through the several bearing and spacing plates and through the end walls 116 and 117 and reinforce the keys 112 in holding the several plates in fixed position. The plate 110 is provided with bearing receiving recesses in which are received the anti-friction bearings 122 and 123 cooperating with the extended ends of the shafts 90 and 95. The shaft 90 is also rotatably supported by the antifriction bearing 124 provided in the end plate 116. The holes 125 in the plate 110 are of sufficient diameter so that the gear 100 and the other smaller gears that mesh with the gear 101 can pass through them so that the several parts of the drive can be assembled merely by moving the plates, gear units and bearings in a direction axially of the housing, and when all the parts are in position the plate 116 can be secured to the housing 114 to hold all of the members in their proper locations. Individual attaching means for the several gear units and bearings therefore need not be employed.

The end plate 117 of the speed reducing gearing can be constructed so as to replace the end wall of an electric motor of ordinary construction, and is adapted to be secured by bolts 130 to the motor housing 91 of an existing motor. When thus applied, and with the armature of the motor connected through the reducing gearing to the shaft 90, the latter may be driven at comparatively slow speeds for the operation of a load of any character. The construction is very compact and suitable for the transmission of great forces and yet all of the parts are of simple form and are readily machined and readily assembled together.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A speed changing gear unit of the character described comprising a gear housing, a motor having relatively rotatable elements one of which is connected to said housing, speed changing gearing connected to the other of said elements, said speed changing gearing comprising a series of gear units each embodying a pair of axially aligned relatively fixed gears of different diameters, a longitudinal series of bearing plates fixed in said housing between the ends thereof, and antifriction bearings mounted in said plates and cooperating with said gear units.

2. A speed changing gear unit of the character described comprising a gear housing, a motor having relatively rotatable elements one of which is connected to said housing, speed changing gearing connected to the other of said elements, said speed changing gearing comprising a series of gear units each embodying a pair of axially aligned relatively fixed gears of different diameters, each unit having a pair of bearing race portions, a series of bearing plates in said housing, and antifriction bearings in said plates adapted to be axially removed from said plates and cooperating with the race portions of the gear units.

3. A speed changing gear unit of the character described comprising a gear housing, a motor having relatively rotatable elements one of which is connected to said housing, speed changing gearing in said housing connected to the other of said elements and comprising a series of gear units each embodying a pair of axially aligned connected gears of different diameters, a series of bearing plates arranged in contact with one another in said housing and providing antifriction bearing sockets, antifriction bearings in said sockets cooperating with said gear units, and means rigidly securing said plates to said housing.

4. A gear changing unit of the character described comprising a gear housing having a cylindrical bore, a motor having relatively rotatable elements one of which is connected to said housing, speed changing gearing connected to the other of said elements and comprising a series of gear units each embodying a pair of gears of different diameter and each having a pair of bearing race portions, a series of bearing plates having flat sides arranged in contact with one another and having cylindrical peripheral portions fitting within the cylindrical bore of said housing, antifriction bearings in said bearing plates cooperating with said race portions, and means rigidly securing said plates in said housing.

5. A gear reducer unit of the character described comprising a housing having a cylindrical bore, a series of plates arranged side by side in said bore, end walls for said housing, means securing said plates to said housing, said plates having antifriction bearing sockets, antifriction bearings received in said sockets and adapted to be axially removed therefrom, gear units rotatably supported by said bearings, a driving member for rotating one of said gear units, and a driven member rotated by another of said gear units at relatively low speed, said gear units meshing successively with one another so as to drive said driven member at a speed much less than the speed of the driving member.

6. A gear reducer unit of the character describd comprising a gear housing, an electric motor mounted within said housing and having relatively rotatable stator and armature ements, the stator element being centered in and secured to said housing, and speed reducing gearing, geared to said housing and arranged in said housing at one side of the motor and connected to the armature element.

7. A speed changing gear unit of the character described comprising a gear housing, a motor mounted within said housing and having relatively rotatable elements one of which is secured to said housing, speed changing gearing arranged in said housing at one side of the motor and connected to the other of said elements, said speed changing gearing comprising a series of gear units each embodying a pair of axially aligned gears of different diameters, antifriction bearings for said gear units, and a series of bearing plates arranged side by side and fixed to said housing, said bearing plates having sockets for the reception of said bearings and said gear units.

8. A gear reducer unit of the character described comprising a gear housing, a motor mounted within said housing and having relatively rotatable elements one of which is secured to said housing, speed reducing gearing arranged in said housing at one side of the motor and connected to the other of said elements, said speed reducing gearing comprising a series of gear units each embodying a pair of axially aligned gears of different diameters, antifriction bearings for said gear units, and a series of bearing plates arranged side by side and fixed to said housing, said bearing plates having sockets for the reception of said bearings and said gear units, the bearing plates and bearings being adapted to be assembled part by part from an end of the housing, the bearing plates and the gear units serving to hold the bearings in their proper positions when the gear reducer unit is assembled.

9. A gear reducer unit of the character described comprising a bearing housing, a supporting frame, an electric motor having relatively rotatable elements, one of said elements being secured to said housing, speed reducing gearing connected to the other of said elements, end walls for said housing, antifriction bearing means provided in one of said walls rotatably supporting said other element, antifriction bearing means rotatably supporting said end walls in said supporting frame, a series of bearing plates having cylindrical peripheral surfaces fitting within said housing and having flat sides arranged one against the other and having sockets receiving bearings and gear units, and bearings and gear units mounted in said plates and providing a speed reducing drive from one of said elements to one of said end walls.

10. A speed changing gear unit of the character described comprising a cylindrical bearing housing, a supporting frame, an electric motor having relatively rotatable elements within the housing, one of said elements being secured to said housing, speed changing gearing connected to the other of said elements, end walls for said housing, antifriction bearing means provided in one of said walls rotatably supporting said other element, antifriction bearing means rotatably supporting said end walls in said supporting frame, a series of bearing plates having cylindrical peripheral surfaces fitting within said housing and having flat sides arranged one against the other and having sockets receiving bearings and gear units, and bearings and gear units mounted in said plates and providing a speed changing drive from one of said elements to one of said end walls.

11. A gear changing unit of the character described comprising a gear housing having a substantially cylindrical peripheral surface providing a cable winding drum, a motor armature, a frame rotatably supporting said drum, said drum having a cylindrical bore, bearing plates arranged side by side and fixed in said bore, and gear units mounted in said plates and providing a speed changing drive from said armature to said gear housing.

12. A speed changing gear unit of the character described comprising a gear housing, an electric motor having a rotatable armature, a driving pinion rotatably supported in said housing and connected to said armature, a driven pinion rotatably supported in said housing in axial alignment with and of different diameter than said driving pinion, a series of circumferentially spaced gear units each having relatively fixed axially aligned gears, one of which meshes with the driving pinion and the other meshing with said driven pinion, plates having cylindrically formed peripheral surfaces fitting within said housing and having bearing receiving sockets, and antifriction bearings received in said sockets and rotatably supporting said gear units.

13. A speed changing gear unit comprising a housing having a cylindrical bore, end walls for said housing, and a series of plates having cylindrical peripheral surfaces received in said bore and having flat sides abutting one against the other, some of said plates having antifriction bearing sockets, antifriction bearings mounted in said sockets, speed changing units mounted in said bearings each unit comprising a driving gear and a driven gear axially aligned therewith and fixed relatively thereto, means securing said plates against relative rotation in said housing, driving means for said gear units, and means driven thereby.

14. A speed changing gear unit of the character described, a housing having a cylindrical bore, bearing plates having flat sides in contact and having cylindrical peripheral surfaces fitting within said bore, key means fixing said plates against rotation in said housing, at least one of said plates having two passages there through both of which are displaced from the center of the plate, and a bearing receiving socket adjacent an end of each of said passages into which an anti-friction bearing can be received.

In testimony whereof I hereto affix my signature.

LESLIE H. WENTE.